(12) United States Patent
Yoo et al.

(10) Patent No.: US 8,671,575 B2
(45) Date of Patent: Mar. 18, 2014

(54) METHOD OF MANUFACTURING TAIL TRIM USING CLAD METAL PLATE

(75) Inventors: Chang Yeol Yoo, Suwon (KR); Gwang Min Yoon, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 7 days.

(21) Appl. No.: 13/529,184

(22) Filed: Jun. 21, 2012

(65) Prior Publication Data

US 2013/0099512 A1     Apr. 25, 2013

(30) Foreign Application Priority Data

Oct. 21, 2011  (KR) ........................ 10-2011-0107932

(51) Int. Cl.
*F01N 13/08*     (2010.01)
*B60K 13/04*     (2006.01)

(52) U.S. Cl.
USPC ........ 29/897.2; 293/113; 228/262.5; 228/156

(58) Field of Classification Search
USPC ............ 29/113, 525.14, 897.2; 228/156, 143, 228/262.5, 173.1, 173.4, 173.6; 432/1
See application file for complete search history.

(56) References Cited

U.S. PATENT DOCUMENTS

| | | | | |
|---|---|---|---|---|
| 2,821,014 A * | 1/1958 | Miller | ............................ | 428/654 |
| 2,841,348 A * | 7/1958 | Stahlhuth | ......................... | 248/65 |
| 2,850,314 A * | 9/1958 | Haigh et al. | .................. | 293/113 |
| 2,992,035 A * | 7/1961 | Tell et al. | ....................... | 293/113 |
| 3,037,275 A * | 6/1962 | Schmitz | ...................... | 228/173.6 |
| 4,132,342 A * | 1/1979 | Nitto et al. | ..................... | 228/136 |
| 4,440,337 A * | 4/1984 | Eckert | .......................... | 228/173.6 |
| 4,477,011 A * | 10/1984 | Austin | ......................... | 228/173.2 |
| 4,586,964 A * | 5/1986 | Finnegan et al. | ........... | 228/173.4 |
| 4,993,619 A * | 2/1991 | Kresse et al. | ................. | 228/135 |
| 4,993,621 A * | 2/1991 | Koy et al. | .................... | 228/173.6 |
| 5,725,695 A * | 3/1998 | Ward et al. | ..................... | 148/552 |
| 6,293,134 B1 * | 9/2001 | Johnson | .......................... | 72/335 |
| 6,350,533 B1 * | 2/2002 | Goto et al. | ..................... | 428/615 |
| 6,732,434 B2 * | 5/2004 | Luo et al. | ...................... | 29/897.2 |
| 6,813,920 B2 * | 11/2004 | Yoshida et al. | .................. | 72/166 |
| 6,962,230 B2 * | 11/2005 | Hanaya et al. | .................. | 180/309 |
| 7,608,345 B2 * | 10/2009 | Burger et al. | .................. | 428/654 |
| 7,686,131 B1 * | 3/2010 | Osterkamp et al. | ........... | 181/227 |

(Continued)

FOREIGN PATENT DOCUMENTS

| | | |
|---|---|---|
| JP | 07-214338 | 8/1995 |
| KR | 20000039368 A | 7/2000 |
| KR | 20090107654 A | 10/2009 |

*Primary Examiner* — David Bryant
*Assistant Examiner* — Jason L Vaughan
(74) *Attorney, Agent, or Firm* — Edwards Wildman Palmer LLP; Peter F. Corless

(57) ABSTRACT

Provided is a method of manufacturing a tail trim using a clad metal plate, and a tail trim made of a clad metal plate, which thus enables decrease in weight and improved corrosion resistance, and which further enables increased heat resistance. The method includes rolling two washed metal materials to obtain an initial clad metal plate, and then heat treating and further rolling the initial clad metal plate to obtain a final clad metal plate; pressing the final clad metal plate, thus forming a main tail trim and a housing, the housing including a tail trim upper cover and a tail trim lower cover; and subjecting the main tail trim and the housing to tungsten inert gas welding, thus manufacturing the tail trim.

9 Claims, 3 Drawing Sheets

(56) References Cited

U.S. PATENT DOCUMENTS

| | | |
|---|---|---|
| 7,976,081 B2 * | 7/2011 | McKee et al. ................ 293/102 |
| 7,998,289 B2 * | 8/2011 | Brodt et al. .................. 148/567 |
| 2001/0046610 A1 * | 11/2001 | Barnes et al. ................ 428/670 |
| 2012/0018497 A1 * | 1/2012 | Takada et al. ............. 228/173.6 |
| 2013/0127189 A1 * | 5/2013 | Brockhoff et al. ............ 293/113 |

\* cited by examiner

METHOD OF MANUFACTURING TAIL TRIM USING CLAD METAL PLATE

CROSS-REFERENCE TO RELATED APPLICATIONS

This application claims under 35 U.S.C. §119(a) priority to Korean Application No. 10-2011-0107932, filed on Oct. 21, 2011, the disclosure of which is incorporated herein by reference in its entirety.

BACKGROUND OF THE INVENTION

1. Field of the Invention

The present invention relates to a method of manufacturing a tail trim using a clad metal plate, and more particularly to a tail trim made of a clad metal plate. The methods and products of the present invention provide weight reduction, improved corrosion resistance, and, further, due to the increased cooling performance resulting from an increase in conductivity, enable increased heat resistance.

2. Description of the Related Art

In a vehicle, a tail trim is mounted to a rear bumper cover, and the tail pipe of a muffler is inserted through the tail trim.

FIG. 1 shows how a tail trim is mounted to the rear bumper cover according to the prior art.

As shown in FIG. 1, the tail trim 10, which is conventionally mounted to the rear bumper cover 20, comprises a main tail trim 11, a tail trim upper cover 12, a tail trim lower cover 13, and a tail trim bracket 14. The tail trim 10 has an opening through which the tail pipe (not shown) of a muffler is inserted, and the opening is aligned to communicate with the exhaust hole 21 of the rear bumper cover 20.

Specifically, the tail trim lower cover 13 and the tail trim bracket 14 are welded and coupled to each other with a flange provided at their corresponding edges. The tail trim lower cover 13 and the tail trim bracket 14, which are welded to each other, are coupled to the main tail trim 11 so as to be assembled to the exhaust hole 21 of the rear bumper cover 20. As such, the insert portion 15 of the tail trim 10, through which the tail pipe is inserted, is connected by bolts to the rear bumper cover 20 by means of the tail trim bracket 14.

Because the exhaust gas of the muffler is finally discharged to the outside of the vehicle by the tail trim, the heat resistance and corrosion resistance of the main tail trim 11 should prevent it from deforming even at high temperatures of 300° C. and greater. The tail trim upper cover 12 and the tail trim lower cover 13 should further possess resistance to chipping and corrosion resistance against exhaust gas and impurities on the road. However, conventional tail trims are manufactured using chromium coated stainless steel, which undesirably results in corrosion resistance problems on the insides of the main tail trim 11, the tail trim upper cover 12 and the tail trim lower cover 13, as well as corrosion resistance problems due to chipping on the outsides the tail trim upper cover 12 and the tail trim lower cover 13.

SUMMARY OF THE INVENTION

Accordingly, the present invention has been made keeping in mind the above problems encountered in the related art, and an object of the present invention is to provide a method of manufacturing a tail trim using a clad metal plate, and a tail trim which is made of a clad metal plate. The present invention, thus, provides a decrease in weight and improved corrosion resistance. Further, higher conductivities provided by the present invention result in an upgrade of cooling performance, which increases heat resistance.

Another object of the present invention is to provide a method of manufacturing a tail trim, which has higher formability compared to conventional tail trim products made of stainless steel and the like, thus reducing the number of defective tail trims produced.

An aspect of the present invention provides a method of manufacturing a tail trim using a clad metal plate, comprising rolling two washed metal materials to obtain an initial clad metal plate, followed by heat treating and further rolling the initial clad metal plate to obtain a final clad metal plate; pressing the final clad metal plate, thus forming a main tail trim and a housing comprising a tail trim upper cover and a tail trim lower cover; and subjecting the main tail trim and the housing to tungsten inert gas (TIG) welding, thus manufacturing the tail trim. The washed metal materials may be any combination of metal materials, such as various types of aluminum and stainless steel In this aspect, the main tail trim may be produced by pressing a clad metal plate comprising a combination of two types of aluminum alloy. For example, the main tail trim may be produced by pressing a clad metal plate comprising an A7075 aluminum alloy and an A5052 aluminum alloy, and one side of the main tail trim to which the housing is welded may comprise the A5052 aluminum alloy. Of course, it is also possible for one side of the main tail trim to which the housing is welded may comprise the A7075 aluminum alloy.

In this aspect, the housing may be produced by pressing a clad metal plate comprising a combination of aluminum and stainless steel. For example, the housing may be produced by pressing a clad metal plate comprising an A7075 aluminum alloy and stainless steel, and the outer layer of the housing may comprise stainless steel and the inner layer thereof may comprise the A7075 aluminum alloy. Of course, it is also possible for the outer layer of the housing to comprise the A7075 aluminum alloy, while the inner layer thereof comprises stainless steel. However, it is generally preferably to form the base (inner layer) of a material that is comparatively cheap and has high processability, while the outer layer (surface) is preferably formed of a material requiring specific properties (e.g. corrosion resistance, resistance to chipping, heat resistance, etc.).

In this aspect, the initial clad metal plate may be obtained by rolling the two washed metal materials using a suitable force for a sufficient period of time to form the plate, such as, for example, a force of 500 tons for 10~20 min. The final clad metal plate may then be obtained by suitable heat treatment and pressing/rolling to achieve bonding of the two metal materials, such as, for example, performing primary heat treatment at 400~450° C. for 2~3 hrs, rolling using a suitable force (e.g. a force of about 500 tons for 10~20 min), followed by secondary heat treatment at 300~350° C. for 2~3 hrs in order to achieve diffusion bonding of the two metal materials.

In this aspect, the TIG welding may be performed according to conventional TIG welding methods, such as by use of an electrode bar made of a SUS 304 material, and a protective gas comprising $N_2$ and $CO_2$ or the like mixed at a suitable ratio such as 2:8.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
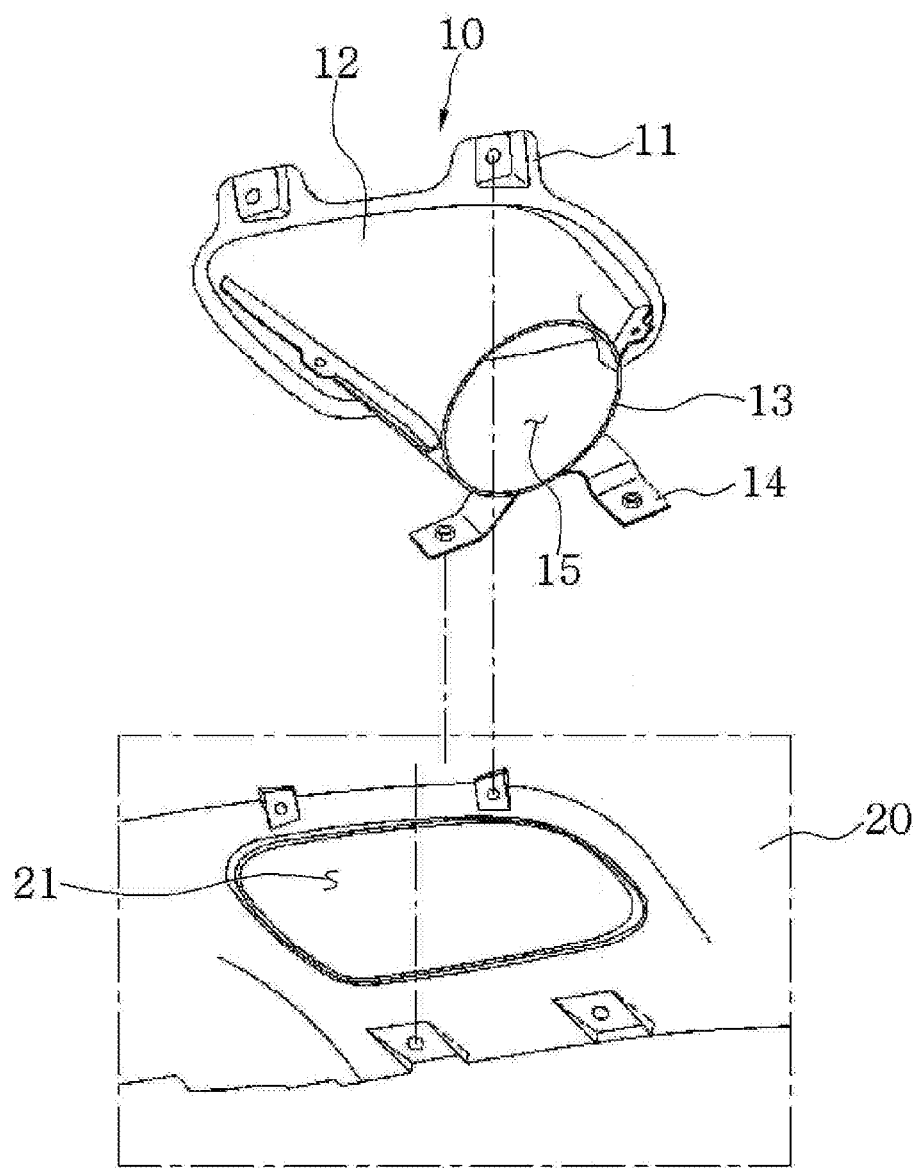
FIG. 1 is a view showing a rear bumper cover and a tail trim assembled to the rear bumper cover according to the prior art.

Hereinafter, a method of manufacturing a tail trim using a clad metal plate according to the present invention will be described with reference to the accompanying drawings. Descriptions of known techniques, even if pertinent to the present invention, are regarded as unnecessary and may be omitted when they would make the characteristics of the invention and the description unclear. Furthermore, the terms and words which will be described herein have been selected based on their functions in the present invention, and may vary depending on the intentions or usages of manufacturers producing the products, and should be defined based on the entire disclose of the present specification.

Also, the embodiments disclosed in the present invention and the constructions depicted in the drawings are merely illustrative and are not to be construed as limiting the scope of the present invention, and thus it should be understood that at the point in time at which the present application was filed they can be replaced by a variety of equivalents and variations.

Figure 2:
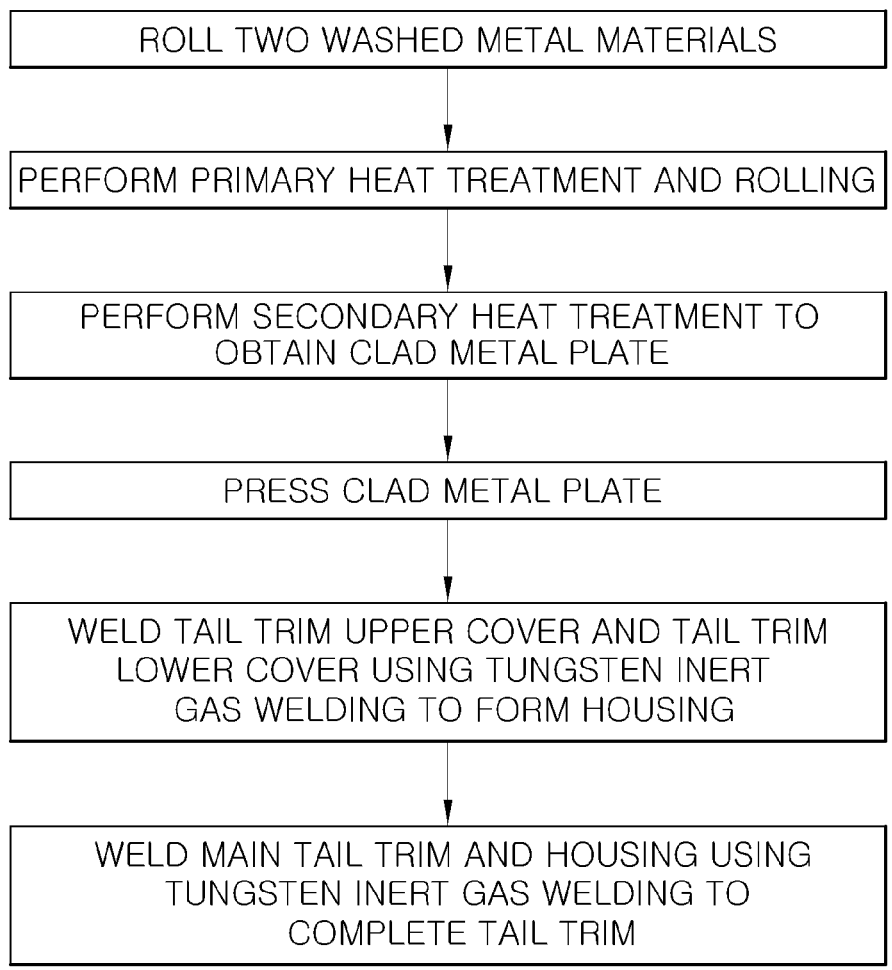
FIG. 2 is a flowchart showing a process of manufacturing a tail trim using a clad metal plate according to an embodiment of the present invention.
Figure 3:
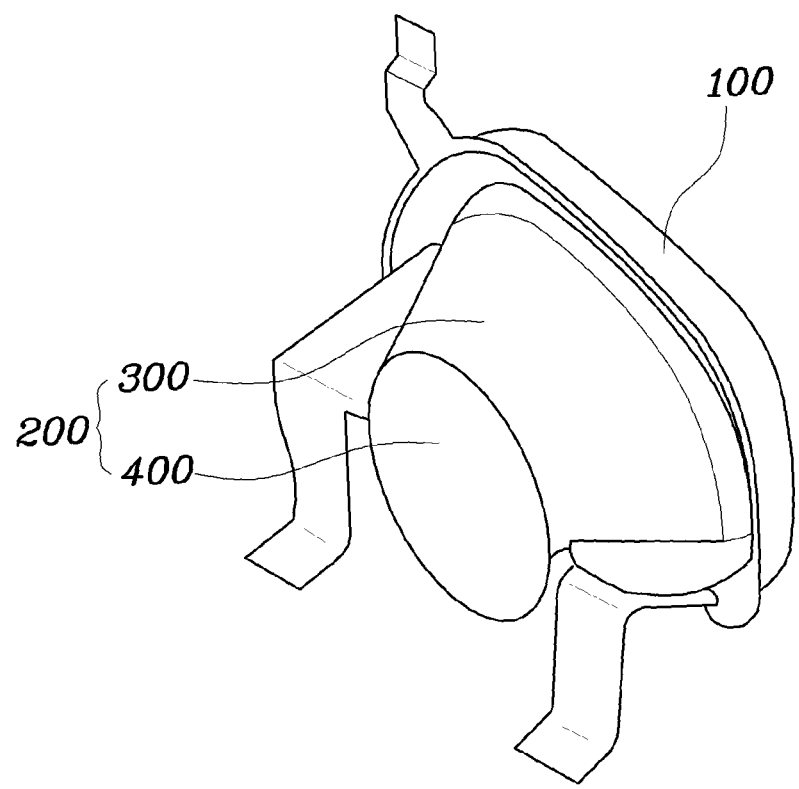
FIG. 3 is a view showing the tail trim manufactured by the process according to an embodiment of the present invention.

FIG. 2 is a flowchart showing a process of manufacturing a tail trim using a clad metal plate according to an embodiment of the present invention, and FIG. 3 is a view showing the tail trim manufactured by the process according to an embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

As used herein, the term "clad metal plate" means a layered composite plate wherein surfaces of two or more metal materials are metallically bonded and integrated. Such materials and methods are widely applied in construction and heavy industries (wherein "heavy industries" generally refers to production of products heavy in weight or heavy in the production processes, those which are expensive or require advanced resources, facilities, etc.) as well as to home appliances, automobiles, etc.

A variety of metal materials may be utilized for the clad metal, and such metals can be selected from any metals conventionally used in forming a clad metal. Many of these metal materials provide properties particularly advantageous for use in forming a tail trim of a vehicle, such that, for example, the performance thereof does not deteriorate even under severe conditions such as high temperature or an acidic corrosion atmosphere. These materials, however, are typically expensive.

The clad metal plate is advantageous because a material that is comparatively cheap and has high processability can be used as the base metal thereof, while a material requiring specific properties can be applied to the surface metal thereof. As such, the material cost can be reduced to thereby increase profitability, and the waste of limited resources can be prevented or reduced.

According to the present invention, the tail trim is manufactured using the clad metal plate as described above, particularly by forming two washed metal materials into a clad metal plate, pressing the clad metal plate, and performing tungsten inert gas (TIG) welding.

Upon producing the clad metal plate, the two washed metal materials are rolled to form an initial clad metal plate, which is then heat treated and further rolled, thus obtaining a final clad metal plate in the form of a single sheet.

Specifically, the two metal materials are first washed by any known method. For example, in the washing process, the materials can be washed by immersion in 30 g/l aqueous $Na_3PO_4$ for 1~2 min. In order to form the initial clad metal plate, the two washed metal materials are rolled using a suitable force, such as a force of about 500 tons for 10~20 min, thus forming the initial clad metal plate.

Subsequently, the initial clad metal plate is heat treated and further rolled, thus obtaining the final clad metal plate.

In order to achieve diffusion bonding of the two metal materials, the initial clad metal plate subjected to heat treatment and further rolling. In accordance with various embodiments, the initial clad metal plate is first primarily heat treated at 400~450° C. for 2~3 hrs, rolled by a force of about 500 tons for 10~20 min, and then secondarily heat treated at 300~350° C. for 2~3 hrs, yielding the final clad metal plate that can be used in manufacturing the tail trim according to the present invention.

If the temperature of the primary heat treatment is too low or high, such as lower than 400° C. or higher than 450° C., then sufficient bonding strength and drawing properties cannot be obtained. Hence, the primary heat treatment is preferably carried out in the temperature range of 400~450° C.

Also, the primary heat treatment time is regarded as important. If the primary heat treatment time is too short or too long, such as shorter than 2 hrs or longer than 3 hrs, then sufficient bonding strength cannot be obtained. Hence, the primary heat treatment time is preferably 2~3 hrs.

By performing the secondary heat treatment process, the clad metal plate may be further stabilized. When the secondary heat treatment is carried out, much higher bonding strength and drawing properties can be obtained compared to such strengths and properties obtained when secondary heat treatment is not performed.

If the temperature of the secondary heat treatment is too high or too low, such as lower than 300° C. or higher than 350° C., bonding strength and drawing properties may be comparatively inferior. Hence, the secondary heat treatment is preferably carried out in the temperature range of 300~350° C.

Subsequently, the clad metal plate thus obtained is pressed. In this procedure, a main tail trim, and a housing comprising a tail trim upper cover and a tail trim lower cover can be processed via pressing using the final clad metal plate.

As shown in FIG. 3, the tail trim includes a main tail trim 100 which can be mounted to a rear bumper cover (not shown) and a housing 200 connected to the main tail trim 100. The housing 200 may be formed by coupling the tail trim upper cover 300 and the tail trim lower cover 400. Pressing is performed to form the main tail trim 100, the tail trim upper cover 300 and the tail trim lower cover 400.

According to an exemplary embodiment, the main tail trim 100 is manufactured by pressing a clad metal plate made of an A7075 aluminum alloy and an A5052 aluminum alloy. Of course, various other combinations of materials conventionally used in forming clad metals could likewise be used in forming the main tail trim 100.

In particular, to form the clad metal plate for the main tail trim, the A7075 aluminum alloy and the A5052 aluminum alloy are mutually bonded using a clad metal plate forming process, thus preparing the clad metal plate. The clad metal plate forming process can be carried out in accordance with conventional processes and, thus, is not described in further detail. The thus formed clad metal plate is then pressed, for example by using a 250 ton press for 20~30 sec, thus obtaining the main tail trim.

According to an exemplary embodiment, the tail trim upper cover 300 and the tail trim lower cover 400 of the housing 200 may be manufactured by pressing a clad metal plate made of an A7075 aluminum alloy and stainless steel. Of course, various other combinations of materials conventionally used in forming clad metals could likewise be used in forming the main tail trim 100.

In particular, to form the clad metal plate for manufacturing the tail trim upper cover 300 and the tail trim lower cover 400, stainless steel and an A7075 aluminum alloy are mutually bonded using a clad metal plate forming process, thus preparing a clad metal plate. Again, the clad metal plate forming process can be carried out in accordance with conventional processes and, thus, is not described in further detail. The thus formed clad metal plate is then pressed, for example by using a 250 ton press for 20~30 sec, thus respectively manufacturing the tail trim upper cover 300 and the tail trim lower cover 400. Then, the tail trim upper cover 300 and the tail trim lower cover 400 are assembled in connection with each other, thus obtaining a hollow type housing 200.

The housing 200 is configured such that the outer layer thereof comprises stainless steel and the inner layer thereof comprises the A7075 aluminum alloy. As noted, various other combinations of materials could also suitably be used, wherein the outer layer will preferably be formed of a material possessing desirable properties for a tail trim of a vehicle and the inner layer will preferably be formed of a material that is comparatively cheaper and has high processability.

After the formation of the housing 200 and the main tail trim 100, the housing 200 is coupled to the main tail trim 100 by any conventional process, such as by using TIG welding.

Thus, for example, one end of the housing 200 is coupled to one side of the main tail trim 100, namely, the A7075 aluminum alloy thereof, using TIG welding.

When the housing 200 and the main tail trim 100 are coupled using TIG welding, the TIG welding may be carried out using a conventional TIG welding process. For example, TIG welding may be carried out using an electrode bar made of a SUS304 material and having a diameter of 10 mm and a length of 150 mm. Also, a protective gas used for the TIG welding may be any conventional gas mixture, such as a gas mixture comprising $N_2$ and $CO_2$ at a ratio of 2:8. As such, the process can be carried out using a relatively inexpensive gas mixture in lieu of argon gas, which is expensive.

For the TIG welding, the protective gas may be ejected at a suitable rate, such as a rate of 20~30 ml/sec, and cooling water may be emitted at a suitable rate, such as a rate of 100~200 mg/sec, and the welded portion between the housing 200 and the main tail trim 100 can be coated with a suitable active agent, such as 2~4 g/l KOH activating agent, thus enhancing bondability.

As a brief description of a TIG welding process that can be used to weld the housing 200 and the main tail trim 100, the aluminum alloy portions of the tail trim upper cover 300 and the tail trim lower cover 400 are brought into contact with each other and then welded, thus forming the housing 200. Subsequently, one end of the housing 200 thus obtained is brought into contact with the aluminum alloy portion of the main tail trim 100 and then coupled thereto using TIG welding or the like, thereby obtaining the tail trim.

According to an exemplary embodiment, the TIG welding process for welding the tail trim upper cover 300 and the tail trim lower cover 400 or for welding the housing 200 and the main tail trim 100 is performed by feeding a wire, supplying power to the welding bar for a suitable time such as about 5~10 sec so that an arc is generated on the welding bar and the wire is melted. As such, the tail trim upper cover 300 and the tail trim lower cover 400 are coupled to each other. In particular, welding can be conducted at three portions between both ends of the tail trim upper cover 300 and the tail trim lower cover 400 which are coupled to each other. Of course, welding can be carried out in more or less portions between the ends of the tail trim upper cover 300 and the tail trim lower cover 400 so as to suitably couple the components together. The tail trim upper cover 300 and the tail trim lower cover 400, which are welded to each other, are subjected to a suitable pressure for a period of time, such as a pressure of 10 tons for about 10 sec, so that the tail trim upper cover 300 and the tail trim lower cover 400 are securely coupled.

The housing 200, comprising the tail trim upper cover 300 and the tail trim lower cover 400 which are coupled to each other, is coupled to the main tail trim 100 by any suitable means, such as the welding process as mentioned above, thereby forming the tail trim.

The tail trim manufactured using the clad metal plate in accordance with the present invention enables a decrease in weight and improved corrosion resistance and, further, thanks to a cooling performance upgrade due to high conductivity, provides increased heat resistance. Furthermore, compared to conventional tail trim products made of stainless steel, the tail trim of the present invention has higher formability, and thus defect rates of finished products thereof can be remarkably decreased.

Also according to the present invention, when the main tail trim and the housing of the tail trim are coupled to each other, TIG welding can be carried out, thus improving bonding time and bondability compared to conventional methods such as SPOT welding.

As described herein, the present invention provides an improved method of manufacturing a tail trim using a clad metal plate. According to the present invention, the tail trim is made of the clad metal plate, thus enabling a decrease in weight and improved corrosion resistance and further enabling increased heat resistance. Furthermore, the tail trim of the present invention has increased formability compared to conventional tail trim products made of stainless steel, thus reducing the number of defective finished products of the tail trim.

Also according to the present invention, upon coupling the main tail trim to the housing thereof, TIG welding can be carried out, thus improving bonding time and bondability as compared welding processes conventionally used.

Although the embodiments of the present invention have been disclosed for illustrative purposes, those skilled in the art will appreciate that a variety of different variations and modifications are possible, without departing from the scope and spirit of the invention as disclosed in the accompanying claims. Accordingly, such variations and modifications should also be understood as falling within the scope of the present invention.

What is claimed is:

1. A method of manufacturing a tail trim, for a rear bumper of an automobile through which a tail pipe of a muffler is inserted through, using a plurality of clad metal plates, comprising:
   (a) rolling two washed metal materials to obtain a first initial clad metal plate;
   (b) heat treating and further rolling the first initial clad metal plate to obtain a first final clad metal plate;
   (c) pressing the first final clad metal plate to form a main tail trim;
   (d) rolling two additional washed metal materials to obtain a second initial clad metal plate;
   (e) heat treating and further rolling the second initial clad metal plate to obtain a second final clad metal plate;
   (f) pressing the second final clad metal plate into a housing, the housing comprising a tail trim upper cover and a tail trim lower cover; and
   (g) forming the tail trim by coupling one side of the main tail trim to one side of the housing by carrying out tungsten inert gas welding.

2. The method of claim 1, wherein the first initial clad metal plate comprises an A7075 aluminum alloy and an A5052 aluminum alloy.

3. The method of claim 2, wherein the side of the main tail trim that is coupled to the housing is the A5052 aluminum alloy.

4. The method of claim 1, wherein the the second initial clad metal plate comprises an A7075 aluminum alloy and stainless steel.

5. The method of claim 4, wherein an outer layer of the housing is stainless steel, and an inner layer of the housing is the A7075 aluminum alloy.

6. The method of claim 1, wherein the first and second initial clad metal plates are obtained by rolling the two washed metal materials and the two additional washed metal material using a force of about 500 tons for about 10-20 min.

7. The method of claim 1, wherein the steps of heat treating and further rolling the first and second initial clad metal plate to obtain the first and second final clad metal plate comprises:
   performing a primary heat treatment step at about 400-450° C. for about 2-3 hrs;
   rolling using a force of about 500 tons for about 10-20 min;
   performing a secondary heat treatment at about 300-350° C. for about 2-3 hrs in order to achieve diffusion bonding of the metal materials.

8. The method of claim 1, wherein the tungsten inert gas welding is performed using an electrode bar made of a SUS 304 material.

9. The method of claim 1, wherein the tungsten inert gas welding is performed using a protective gas comprising $N_2$ and $CO_2$ mixed at a ratio of 2:8.

* * * * *